United States Patent [19]

Kashihara

[11] Patent Number: 4,892,012

[45] Date of Patent: Jan. 9, 1990

[54] AUTOMATIC TRANSMISSIONS OF VEHICLE

[75] Inventor: Tadashi Kashihara, Kyoto, Japan

[73] Assignee: Shimpo Kogyo Kabushiki Kaisha, Kyoto, Japan

[21] Appl. No.: 303,081

[22] Filed: Jan. 30, 1989

Related U.S. Application Data

[63] Continuation of Ser. No. 96,751, Sep. 11, 1987, abandoned, which is a continuation of Ser. No. 697,632, Feb. 4, 1985, abandoned.

[30] Foreign Application Priority Data

Feb. 2, 1984 [JP] Japan .................................. 59-17480
Oct. 24, 1984 [JP] Japan ................................. 59-223779

[51] Int. Cl.$^4$ ........................ F16H 15/50; F16H 57/10
[52] U.S. Cl. ....................................... 74/772; 74/796; 74/191
[58] Field of Search ................... 74/191, 772, 796, 690

[56] References Cited

U.S. PATENT DOCUMENTS

| | | | |
|---|---|---|---|
| 2,836,994 | 6/1958 | Weber | 74/796 |
| 2,862,407 | 12/1958 | Lutz | 74/796 |
| 2,883,883 | 4/1959 | Chillson | 74/796 X |
| 3,023,642 | 3/1962 | Maichen | 74/796 |
| 3,108,496 | 10/1963 | Kashihara | 74/796 |
| 3,108,497 | 10/1963 | Kashihara | 74/796 |
| 4,232,561 | 11/1980 | Kashihara et al. | 74/796 X |
| 4,322,798 | 3/1982 | McCoin | 74/191 X |
| 4,393,964 | 7/1983 | Kemper | 74/191 X |
| 4,424,726 | 1/1984 | Galbraith | 74/796 |

FOREIGN PATENT DOCUMENTS

| | | | |
|---|---|---|---|
| 2344422 | 3/1974 | Fed. Rep. of Germany | 74/796 |
| 57-47061 | 3/1982 | Japan | 74/796 |
| 58-163855 | 9/1983 | Japan | 74/796 |

Primary Examiner—Dwight G. Diehl
Attorney, Agent, or Firm—Bradford E. Kile

[57] ABSTRACT

Disclosed is a stepless speed change gear including a plurality of conical rollers each of which is provided with a conical surface frictionally engaging with a ring-member moved by a speed changing assembly. A surface of concave cross-section frictionally engages with a sun-member on an input shaft, and a flat surface frictionally engages with a non-rotatable disc member. A gear train is provided to extend the speed range to include a speed ratio of 1:1. A release mechanism is provided for the non-rotatable disc member, and a clutch mechanism is provided for direct coupling of the input and the output shaft. Power is transmitted by direct coupling of the input and the output shaft.

3 Claims, 4 Drawing Sheets

AUTOMATIC TRANSMISSION OF VEHICLE

This application is a continuation, of application Ser. No. 07/986,751, filed 09/11/87 now abandoned which is a continuation of Ser. No. 697,532 filed 02/04/85 now abandoned.

PRIOR ART

There is a type of stepless speed change gear wherein a plurality of planet rollers with a conical surface frictionally engaging with a ring-member moved by a speed changing means, a surface of concave cross-section frictionally engaging with a sun-member on an input shaft and a flat surface frictionally engaging with a non-rotatable discmember are provided. This type of speed change gear is disclosed in Japanese patent No. 1,120,097 (Japanese patent application bulletin No. 13,221/1982) U.S. Pat. No. 4,232,561 and West Germany patent application No. P 28 25 730.9-12 laid open under No. 28 25 (730/1979; and owing to its unique torque-speed characteristics that it can generate very large torque at a speed which is near to zero, this type of speed change gear is suitable for a vehicle, and a vehicle provided this type of stepless speed change gear can start without aid of any clutching means.

The above patents disclose also a type wherein rotation of the above said ring-member is constrained and the rotation of the above said disc is transmitted to an output member. This type of speed change gear has a torque-speed characteristic similar with that of above explained type and a vehicle provided with this type of speed change gear can start also without aid of any clutching means. And, such type of automatic transmissions are disclosed in Japanese patent application No. 58-25298 laid open under No. 151.565/1984 and Japanese patent application No. 58-41968 laid open under No. 166,754/1984.

OBJECT

When the above type of stepless speed change gear is accommodated for a vehicle, there occurs a problem about the durability of the speed change gear; the planet roller should not be worn to make any groove or grooves on its conical surface due to the use of definite portion or portions over a too long time.

The present invention intends to solve the above problem concerning the durability of the stepless speed change gear of the above mentioned type which is utilized for the automatic transmission of vehicle.

CONSTRUCTION

The automatic transmission according to the present invention is as follows. Automatic transmission of a vehicle wherein a stepless speed change gear equipped with a plurality of planet-rollers having conical surface frictionally engaging with an axially movable ring-member, a surface of concave cross-section frictionally engaging with a sun-member on the input shaft of the transmission and a flat surface frictionally engaging with a non-rotatable disc-member is proviced, and the rotation of the axially movable ring-member is transmitted to an output member, characterized in that;

a. A speed increasing gear means is provided between the output member of the stepless speed change gear and in the output shaft of the transmission, upper limit of the speed ratio between the input shaft and the output shaft of the transmission being increased to 1:1 by the provision of this speed increasing gear means, and in that;

b. A first means for finding out a state wherein the above speed ratio increased to 1:1, and a second means for finding out a state wherein the above speed ratio should be decreased from 1:1 are provided, and in that;

c. A clutch means is provided between the input shaft of the transmission and the output member of the stepless speed change gear, this clutch means being operated to take an engaged state by a signal from the above first means and being operated to take a disengaged state by a signal from the above second means, and in that;

d. A releasing means which operates simultaneously with the clutch-means to release the stepless speed change gear is provided.

In the above constitution, the stepless speed change gear is a type having a speed reduction range below about ⅓, through it has a desirable torque-speed characteristics as mentioned before. Therefore, the speed of the output member can not reach that of the input shaft even when the ring-member is moved to a position of maximum speed ratio. The speed increasing means fills up insufficiency of the speed range so that the output-member of the stepless speed change gear can drive the output shaft of the transmission at a speed which is equal with that of the input shaft. By the provision of the speed increasing means, the input shaft and the output shaft of the transmission can be synchronized at an instant when the ring-member of the stepless speed change gear reach a position of maximum speed ratio. Power transmission between the input shaft and the output shaft of the transmission includes a speed reduction by the stepless speed change gear and speed increase by the speed increasing means.

To simplify the expressions, two symbols "F" and "C" will be used hereafter. "F" is a power transmission through the stepless speed change gear, and "C" is a power transmission through the clutch-means which makes a directly coupled state between the input and output shafts of the transmission.

Transfers from "F" to "C" occur when the ring-member of the speed change gear reach a position of maximum speed ratio. On the other hand, transfers from "C" to "F" occur when decrease of speed-ratio (speed of the output member/speed of the input shaft) is required. The clutch-means to make "C" is released in response to this requirement, and as soon as the clutch-means is released, state of "F" appears in place of the state of "C". The distance of running under the state "F" is very small and it is merely 10–20% of total running distance. In other words, most of running occurs at the state of "C" extinguishly decreasing the time of operation of the stepless speed change gear. Conclusively speaking, in the case of the above automatic transmission, the stepless speed change gear is operated only in a short time so that it has a long life.

The present invention will be explained hereafter referring to the drawings in which.

Figure 1:
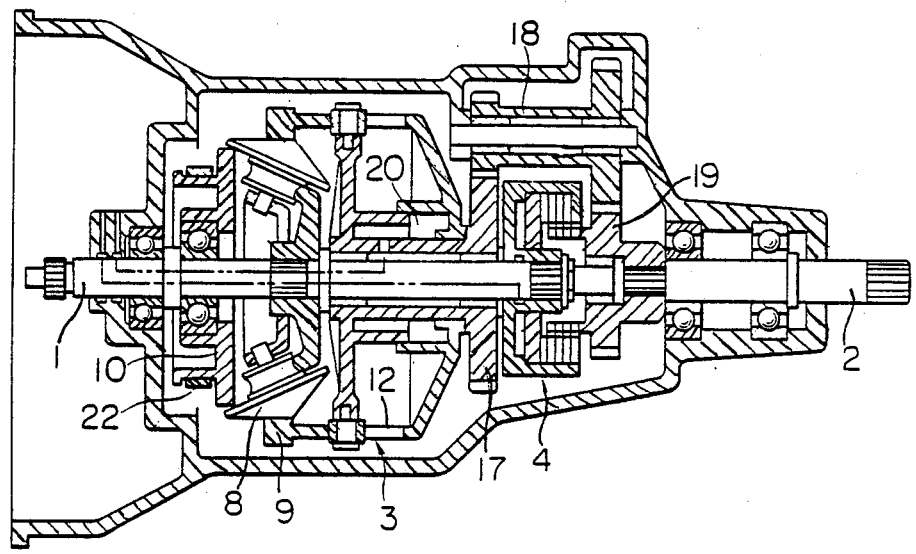
FIG. 1 is a longitudinally sectioned view of an automatic transmission according to the present invention.
Figure 2:
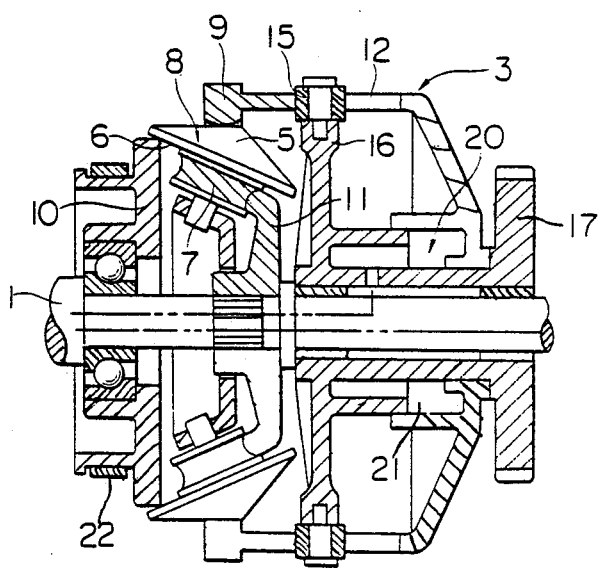
FIG. 2 is a view showing a part of FIG. 1 in an enlarged scale.
Figure 3:
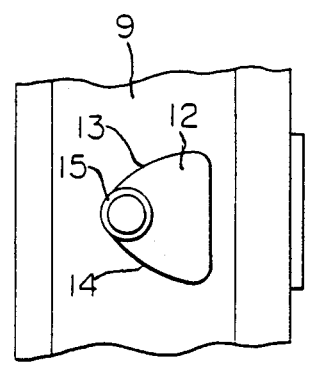
FIG. 3 is a view showing a profile of cam means in FIG. 1 and FIG. 2.

Referring to FIG. 1, an automatic transmission is provided with an input shaft 1 and an output shaft 2. 3 is a stepless speed change gear, the main parts of which are shown in FIG. 2 and FIG. 3. A clutch-means 4 is provided for directly coupling the input shaft 1 with the output shaft 2. As shown in FIG. 2, the stepless speed change gear is equipped with a plurality of planet rollers 8 having a conical surface 5 frictionally engaging with an axially movable ring-member 9, a surface 7 of concave cross section frictionally engaging with a sun-member 11 on the input shaft 1 and a flat surface 6 frictionally engaging with a non-rotatable disc-member 10.

The ring-member 9 has openings 12 forming cam-surface 13, 14, and the rotation of the ring-member 9 is transmitted to the output shaft 2 by means of a roller 15 engaging with the cam-surface 13, 14, a member 16 provided with the roller 15, a gear train consisting of a gear 17, a twin gear 18 and a gear 19. The speed of the output shaft 2 decreases when the ring-member 9 is moved leftwards so that the effective radius of the planet roller 8 increases. And, it reach zero at an position which is on the bottom side of the conical surface 5. As before explained, this type of stepless speed change gear has an agreeable and unique torque-speed characteristics enabling the vehicle start without any aid of clutching means. Two forces act on the ring-member 9. One of them is a force due to a torque acting on the output shaft 2 and it acts to move the ring-member 9 so that the speed of the output shaft 2 decreases. The other of them is a force by a hydraulic means 20 or a spring which is equivalent with the hydraulic means 20, and it acts to move the ring-member 9 so that the speed of the output shaft 2 increases. The ring-member 9 moves to a position wherein the above two forces balance.

Figure 4:
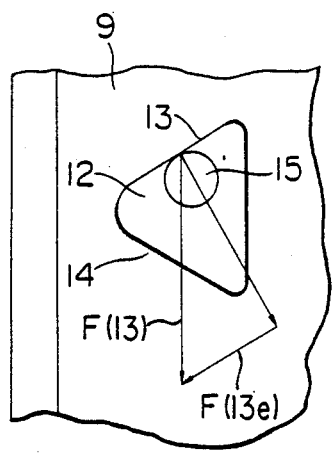
FIG. 4 and FIG. 5 are views for explaining the function of cam means shown in FIG. 3.
Figure 5:
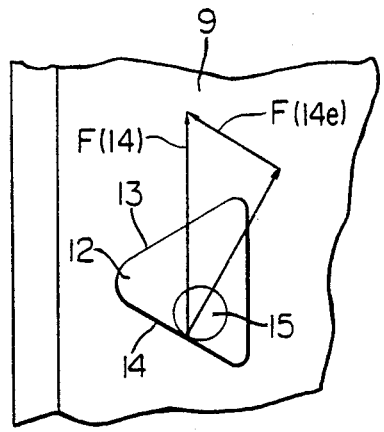

Therefore, it moves to low-speed side when the torque acting on the output shaft 2 increases, and moves to high-speed side when the above torque decreases. FIG. 4 and FIG. 5 shown forces F(13), F(14) acting on the cam surface 13, 14, and their effective components F(13e), F(14e) schematically.

The gear ratio of speed increasing gear means including the gears 17-19 is selected so that a speed ratio between the input shaft 1 and the output shaft 2 can reach 1:1.

As already explained, transfer from "F" (power transmission through the stepless speed change gear 3 and the above speed increasing means) to "C" (power transmission through the clutch-means which makes a directly coupled state between the input shaft 1 and the output shaft 2 of the transmission) occurs when the above speed ratio become 1:1.

Figure 6:
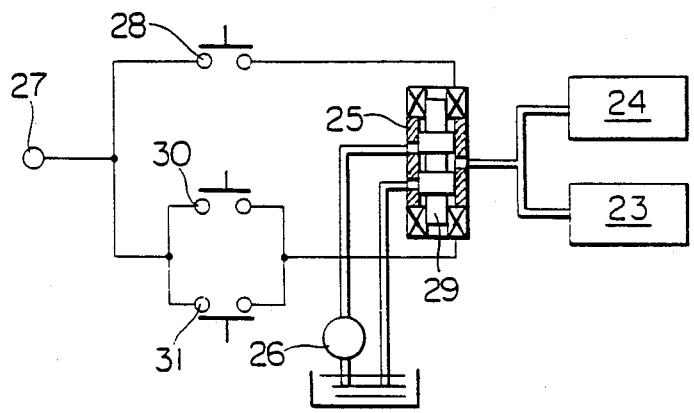
FIG. 6 is a circuit-diagram showing devices for changing the state of the automatic transmission shown in FIG. 1.

To enable the transfer from "F" to "C", the disc-member 10 of the stepless speed change gear is capable of being released its constrain by a band-brake 22. The device for releasing the disc-member 10 is shown in FIG. 6 together with a device for engaging and disengaging the clutch-means 4. In FIG. 6, 23 and 24 are hydraulic cylinders for operating the band-brake 22 and the clutch means, respectively. 25, 26, and 27 are an electro-magnetically operated spool valve, and oil pump and an electric source, respectively. When the ring-member 9 comes to a position wherein the speed ratio between the input shaft 1 and the output shaft 2 is 1:1, an electric contact 28 is closed by an abutment of the ring-member 9 to a stationary stopper. Then, a spool 29 of the spool valve 25 moves upwardly so that the release of the band-brake 22 by the hydraulic cylinder 23 and the engagement of the clutch-means 4 by the hydraulic cylinder 24 occur simultaneously, thus changing the state of power transmission from "V" to "C".

In the state of "C", the whole of the stepless speed change gear 3 rotates freely without transmitting any power. The return from "C" to "F" occurs when an electric contact 30 or an electric contact 31 closes. These contacts are those for moving the spool 29 of the spool valve 25 downwardly so that the hydraulic cylinders 23, 24 return the band-brake 22 and the clutch-means 4 to the state of "V". One electric contact 30 closes in response to an operation of accelerator-pedal or the like when the vehicle comes to run on an upwardly inclined road, and the other electric contact 31 closes in response to an operation for reducing the speed of the vehicle (operation of brake-pedal or release of accelerator-pedal). The above transfer from "V" to "C" and that from "C" to "V" occur following the running state of the vehicle automatically.

Generally speaking, the spool 29 of the spool-valve is moved downwardly on an occurrence of a state wherein reduction of speed ratio should be reduced below 1:1. Change from "F" to "C" and that from "C" to "F" occur repeatedly.

Figure 7:
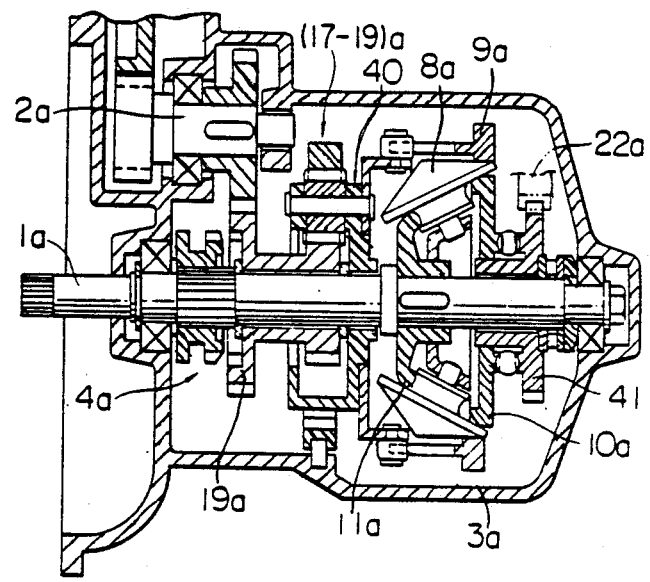
FIG. 7 is a longitudinally sectioned view of another automatic transmission according to the present invention.
Figure 8:
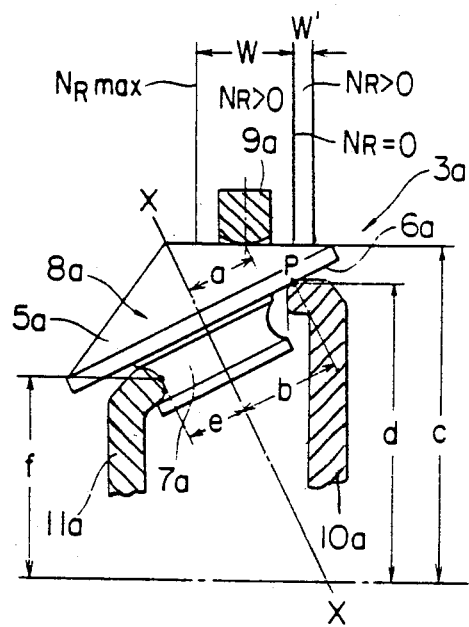
FIG. 8 is a view showing effective radii of frictionally engaging elements of the stepless speed change gear shown in FIG. 7.
Figure 9:
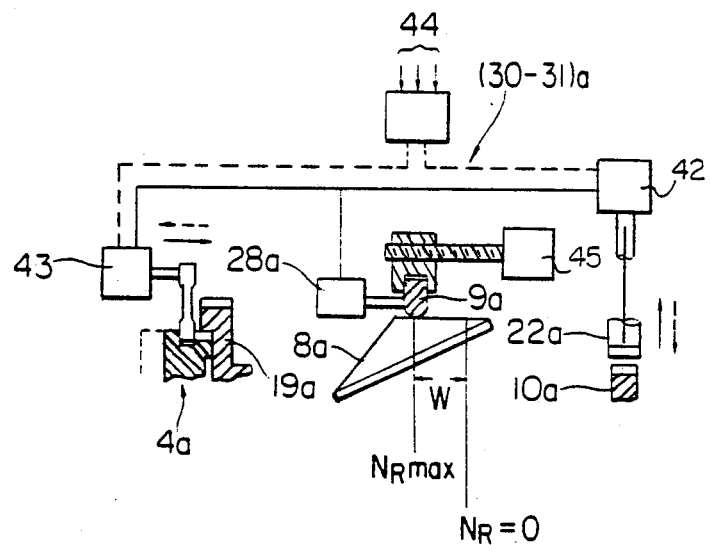
FIG. 9 is a circuit-diagram showing devices for changing the state of the automatic transmission shown in FIG. 7.

However, total distance and time relying on "F" are small in comparison with those relying on "C". FIG. 7–FIG. 9 show another automatic transmission of vehicle according to the present invention. As the construction is similar with that shown in FIG. 1, parts corresponding to those of the transmission shown in FIG. 1 are designated by the same numerals added a suffics "a". For example, 1a is an input shaft and 2a is an output shaft. There are following differences between the transmission and that shown in FIG. 7–FIG. 9.

(a) A speed increasing gear means (17–19)a is a differential gear type, and its carrier 40 of planet gears is driven by a ring-member 9a.

(b) A disc-member 10A is constrained by a member 22a meshing with a gear 41. An actuator moving to release the disc-member 10a is an actuator 42 shown in FIG. 9.

(c) To enable the vehicle running in a backward direction, frictionally engaging point P between a disc-member 10a and a flat surface 6a is selected as shown in FIG. 8 so that a small range W' wherein speed ratio is negative. In FIG. 8, $a$–$f$ are effective radii. There is a following relation between a speed $N1$ of an input shaft and a speed $NR$ of an output member.

$$NR = \frac{f(bc - ad)}{c(fb + ed)} N1$$

It will be understood that $N_R = 0$ when a condition of $a:b = c:d$ is satisfied. The range W for the running of vehicle in a forward direction is much wider than the above range W' for the running of vehicle in backward direction.

(d) The actuator 42 mentioned in the above item "b" and an actuator 43 for engaging and disengaging a clutch-means 4a are operated by signals 44 which are generated similarly with the case of transmission shown in FIG. 1.

(e) The ring-member 9a is moved by a pilot-motor 45, and is not moved by a cam-means.

I claim:

1. Automatic transmission of vehicle including a stepless speed change gear equipped with a plurality of planet-rollers having a conical surface frictionally engaging with a axially movable ring member, a surface of concave cross-section frictionally engaging with a sun-member on an input shaft of the transmission and a flat surface frictionally engaging with a disc-member normally constrained against rotation, the rotation of the axially movable ring-member being first transmitted to an output member of the stepless speed change gear, characterized in that:

a. speed increasing gear means provided between the output member of the stepless speed change gear and in the output shaft of the transmission, an upper limit of the speed ratio between the input shaft and the output shaft of the transmission being increased to 1:1 by the provision of this speed increasing gear means, and in that;

b. first means for finding a state wherein the above speed ratio increased to 1:1, and second means for finding a state wherein the above speed ratio should be decreased from 1:1 are provided, and in that;

c. clutch-means provided between the input shaft of the transmission and the output member of the stepless speed change gear, this clutch means being operated to take an engaged state by a signal from the above first means and being operated to take a disengaged state by a signal from the above second means; and in that:

d. releasing means which operates simultaneously with said clutch-means to release the stepless speed change gear; and e. means for determining the position of said ring-member corresponding to a torque acting on said output shaft, which is composed of a cam device on a member provided between said ring-member and said output shaft and means for applying a force in a speed increasing direction to said ring-member.

2. Automatic transmission of vehicle according to claim 1 characterized in that said speed increasing means is constructed by a gear train including a twin gear.

3. Automatic transmission of vehicle according to claim 1 characterized in that said speed increasing means is constructed by a gear train of differential gear type.

* * * * *